United States Patent [19]
Holladay

[11] Patent Number: 6,038,775
[45] Date of Patent: *Mar. 21, 2000

[54] CHAIN SAW ACCESSORY FOR SUPPORTING A CHAINSAW DURING VERTICAL CUTTING

[76] Inventor: Will L Holladay, HCR 67 Box 24, Independence, Calif. 93526

[ * ] Notice: This patent issued on a continued prosecution application filed under 37 CFR 1.53(d), and is subject to the twenty year patent term provisions of 35 U.S.C. 154(a)(2).

[21] Appl. No.: 09/048,128

[22] Filed: Mar. 25, 1998

[51] Int. Cl.[7] ................................................. B23D 47/02
[52] U.S. Cl. ................................ 30/376; 30/377; 30/387
[58] Field of Search .......................... 30/375, 376, 371, 30/377, 381, 383, 387; 83/754, 574, 581; 143/32

[56] References Cited

U.S. PATENT DOCUMENTS

| | | |
|---|---|---|
| 3,092,156 | 6/1963 | Hayden . |
| 3,845,556 | 11/1974 | Edmunson . |
| 3,864,830 | 2/1975 | Haddon . |
| 3,965,788 | 6/1976 | Granberg . |
| 4,476,759 | 10/1984 | Aderneck . |
| 4,854,206 | 8/1989 | Wilfong . |
| 5,077,896 | 1/1992 | Rivera . |
| 5,427,007 | 6/1995 | Bystrom . |

*Primary Examiner*—M. Rachuba
*Attorney, Agent, or Firm*—Philip J. Anderson; Quirk & Tratos

[57] ABSTRACT

A chainsaw foot for supporting the weight of a chainsaw during substantially vertical use and for fixing the angular orientation between the chainsaw guidebar and the material to be cut. One side of a hinge is attached to a substantially flat baseplate having a rectangular aperture therethrough. The other side of the hinge is attached to a U-shaped clamp. The chainsaw guidebar is removably fixed between the legs of the U-shaped clamp by set screws. A slotted adjusting bracket is fixed to the baseplate proximate to the U-shaped clamp. A locking means attached to the U-shaped clamp engages the slot of the adjusting bracket to thereby allow a user to set and lock the angle of the chainsaw guidebar with respect to baseplate and, consequently, the material to be cut.

2 Claims, 4 Drawing Sheets

CHAIN SAW ACCESSORY FOR SUPPORTING A CHAINSAW DURING VERTICAL CUTTING

BACKGROUND—FIELD OF THE INVENTION

The invention is in the area of chain saws angularly adjustable in relation to the work surface for purpose of detailed freehand milling of dimensional lumber.

| Cross references | | | |
|---|---|---|---|
| 3,092,156 | 6/63 | Hayden | 143-32 |
| 3,845,556 | 11/74 | Edmunson | 30/381 |
| 3,864,830 | 2/75 | Haddon | 30/371 |
| 3,965,788 | 6/76 | Granberg | 83/745 |
| 4,476,759 | 10/84 | Aderneck | 83/574 |
| 4,854,206 | 8/89 | Wilfong | 83/745 |
| 5,077,896 | 1/92 | Rivera | 30/22 |
| 5,427,007 | 6/95 | Bystrom | 83/871 |

No federally funded R&D was involved in this invention.

BACKGROUND—DESCRIPTION OF PRIOR ART

In a search of prior art many accessories were found which allow for the precision milling of framing lumber with the gas powered chainsaw. Most are oriented in the horizontal position using the bottom of the chainsaw bar as the cutting edge. When using this edge, the chain cutters are returning to the power head throwing wood chips toward the operator and the direction of tool travel. This method obscures a view of the cut area and necessitates use of a guide tool to make accurate cuts.

Edmunson, U.S. Pat. No. 3,845,556 (1974), and the similar patent pending "Beam Boss", are operated in a downward chopping motion using the bottom of the chain bar with the operator supporting most of the chainsaw weight. In both instances, the saw foot guide attached to the chain bar further obscures a view of the cutting area. Wilfong, U.S. Pat. No. 4,854,206 (1989), differs from these two by using a clamping jig attached to the work rather than a saw foot guide attached to the chain bar. This allows better vision of the work area, but the unit cannot make long milling cuts, is quite cumbersome and not easily portable.

The devices of Grandberg, U.S. Pat. No. 3,965,788 (1976), Haddon, U.S. Pat. No. 3,864,830 (1975), Bystrom, U.S. Pat. No. 5,427,007 (1995), and Aderneck, U.S. Pat. No. 4,476,759 (1984), position the saw in the vertical orientation for milling logs into dimensional lumber. These devices are not laterally angularly adjustable in relation to the work surface, and reguire a special guide track for the device to traverse. They also use the bottom cutting edge of the chain bar causing flying wood chips to obscure the cut area. Hayden, U.S. Pat. No. 3,092,156 (1963),differs from the previous four mentioned patents only in the substitution of rollers for the guide track.

Rivera, U.S. Pat. No. 5,077,896 (1992) is one example of the many electric circular saws modified with the addition of a chainsaw bar. These tools are laterally angularlly adjustable in relation to the work surface, but are grossly underpowered, provide no provisions for automatic oiling, have a saw foot much too small to properly stabilize the long chain bar for an accurate cut, and use the returning chain cutters as a cutting edge obscuring the cut with flying wood chips.

SUMMARY

Gas powered chainsaws are used by skilled professionals to fell trees which are cut into dimensional lumber at the sawmill. Dimensional lumber is then cut to size at the construction site using electric circular saws. These saws are limited to a cutting depth of approximately six inches. When gang cutting large rafters which are racked together on edge, a greater cutting depth is needed. The electric circular saw modified with a chainsaw bar attempts to solve this problem but is inadequate as mentioned in the discussion of the prior art. On the other hand, the gas powered chainsaw is two to five times more powerful on the average than the electric circular saw and has an automatic oiling system for the chain bar. The one drawback of the gas powered chainsaw is that it has no saw foot to position the chain bar for accurate cuts.

My accessory modifies the gas powered chainsaw into a laterally angularly adjustable vertical cutting machine using the top cutting edge of the chainsaw bar similar to a jigsaw and operated freehand supported by the work. My accessory is specifically designed for the vertical milling of rafter headcuts. It is laterally angularly adjustable from vertical through 75 degrees from the vertical. It has a wide sturdy baseplate which fully supports the weight of the saw through its angular range and provides exceptional stability for accurate freehand cuts with a long chain bar. By using the top cutting edge of the chain bar, the chain cutters throw wood chips away from the operator and cut area. This, in combination with the large opening in the baseplate and the U shaped bar clamp being located well behind the upper cutting edge of the chain bar, provide an unobstructed view of the cutting chain as it is applied to the wood. With my new tool the operator can easily guide the gas powered chainsaw to follow a snapline or scribed arc.

DESCRIPTION OF THE PREFERRED EMBODIMENTS

Figure 1:
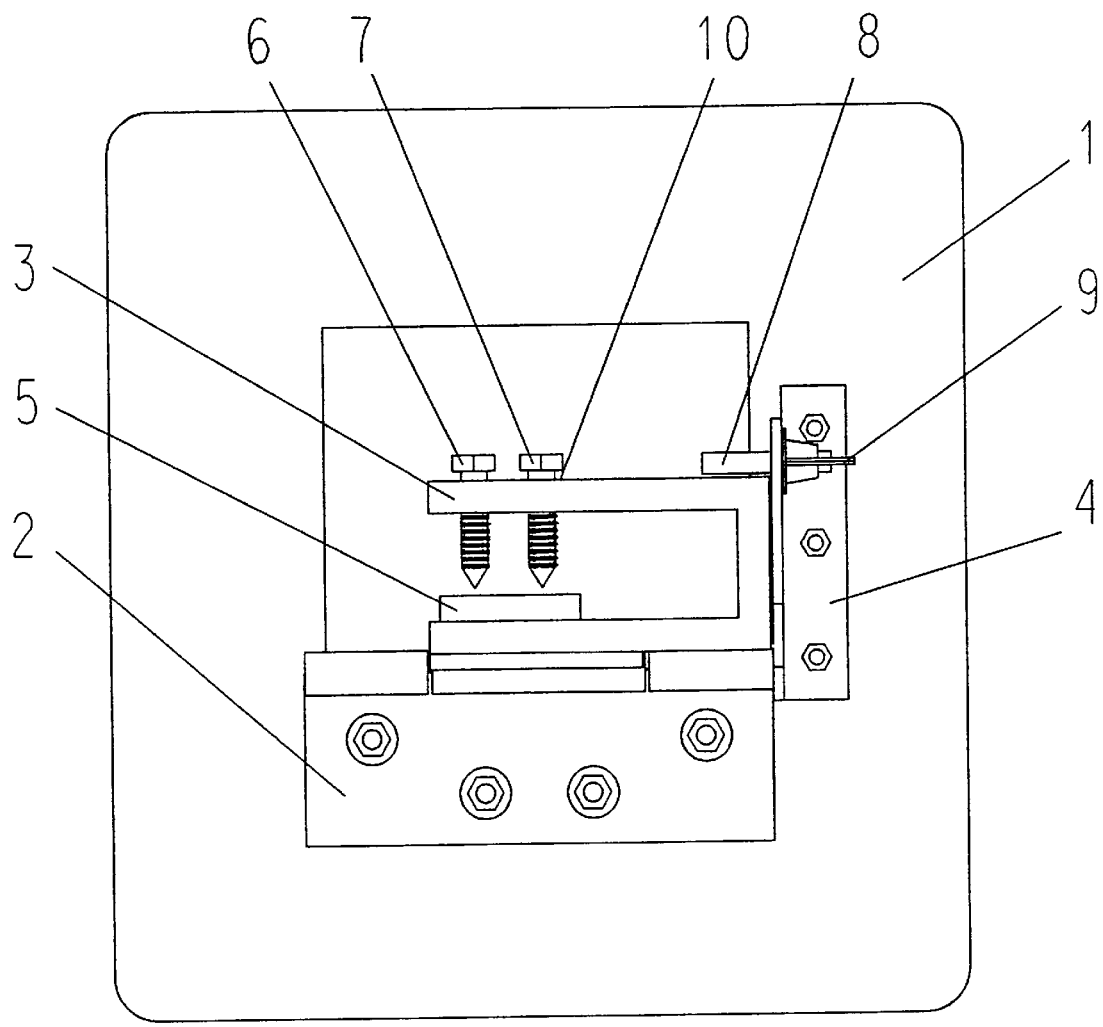
FIG. 1. Plan view of the accessory.
Figure 2:
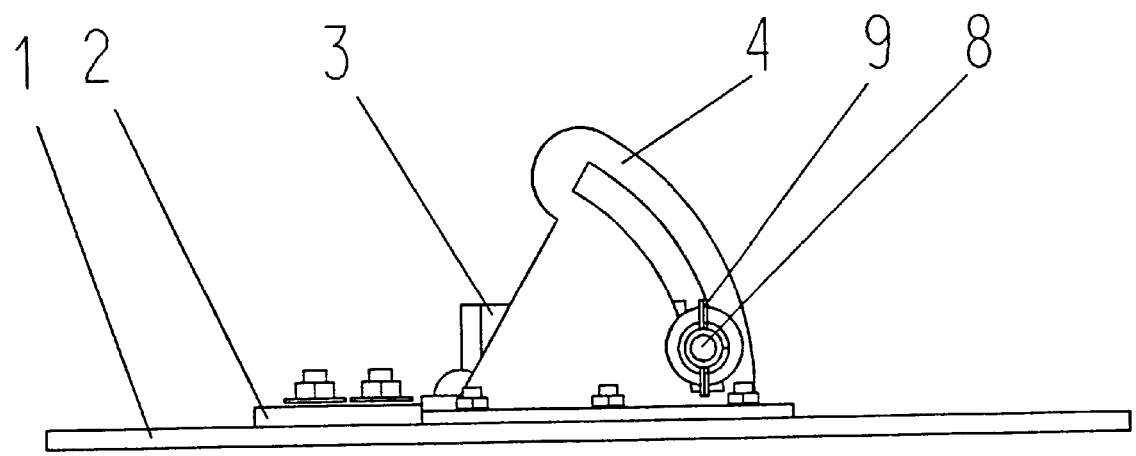
FIG. 2. Back view of the accessory
Figure 3:
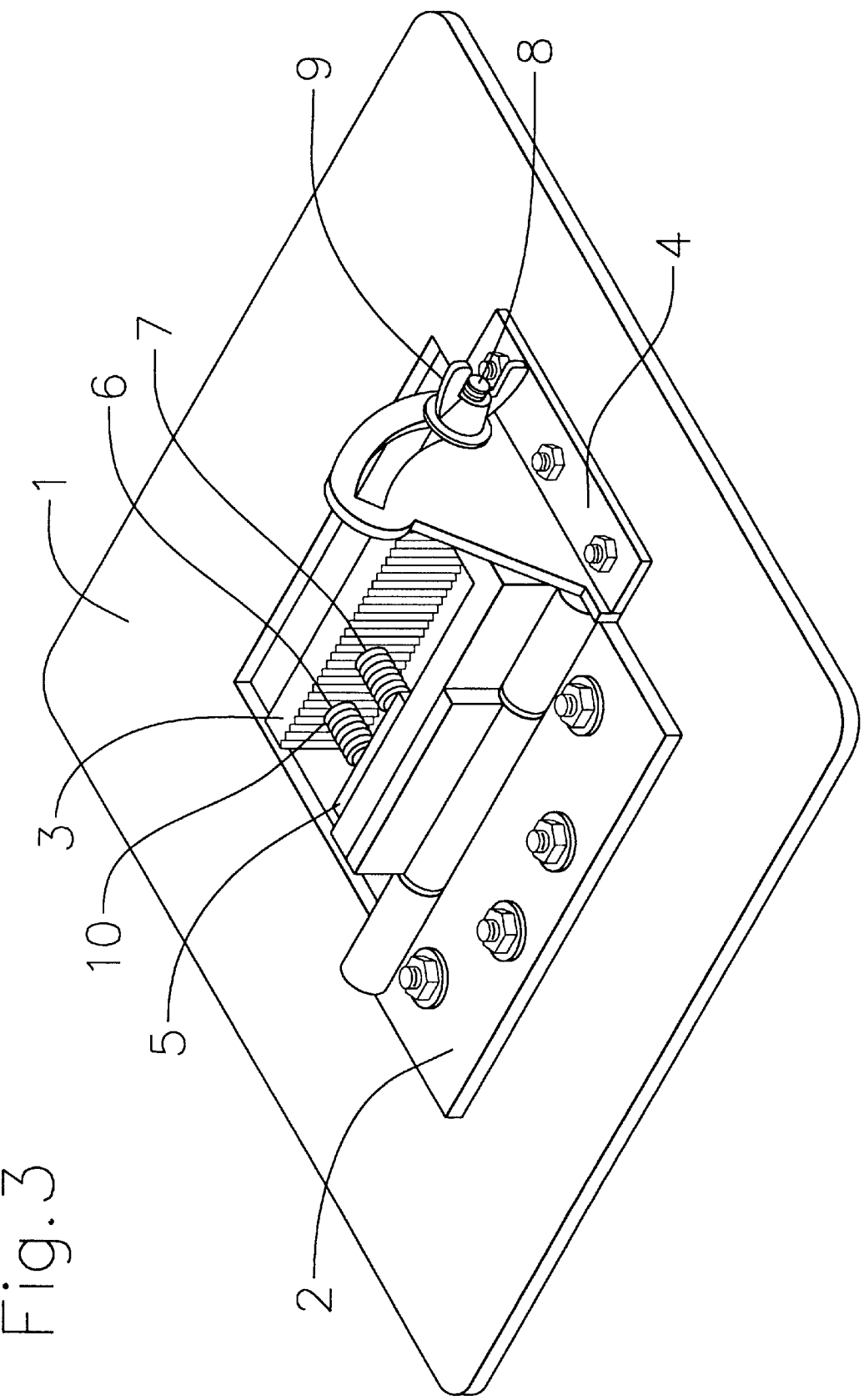
FIG. 3. Perspective view of the accessory
Figure 4:
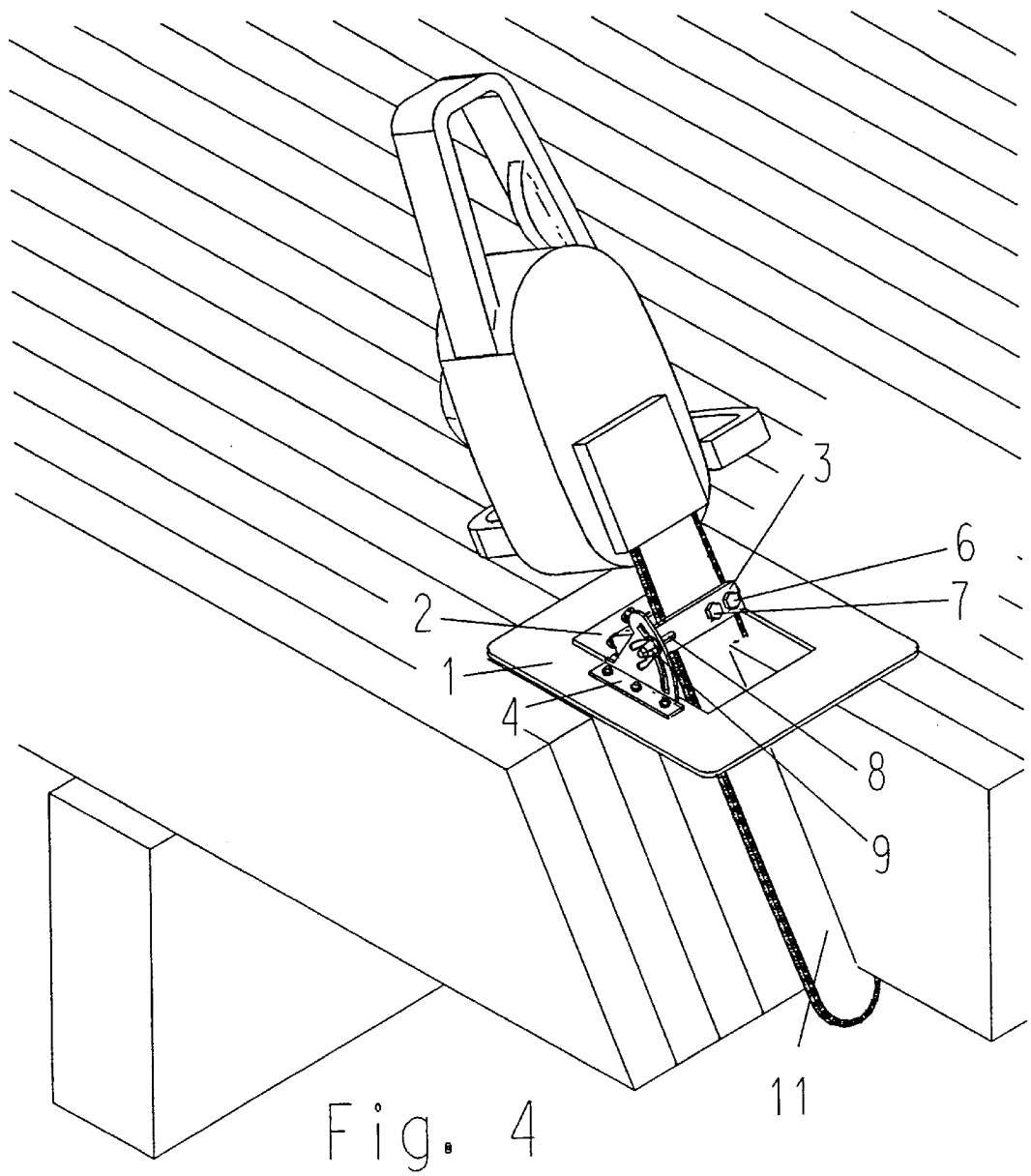
FIG. 4. Perspective view of the accessory in application.

The accessory comprises: a baseplate 1 with central rectangular aperture formed of aluminum or other suitable material having all leading and trailing bottom edges chamfered at 45 degrees, a hinge 2 attached to baseplate 1 commonly by welding or screw fasteners, a slotted angle adjusting bracket 4 with gradation markings attached to baseplate 1 commonly by welding or screw fasteners, a U shaped clamp 3 attached to hinge 2 commonly by welding or screw fasteners, two set screws 6 and 7 are screwed into threaded holes 10 on outer leg of clamp 3, a threaded stud 8 attached to clamp 3 commonly by welding, a wingnut and washer 9 positioned on threaded stud 8, and a hardened backing plate 5 with a scored surface attached inside the inner leg of clamp 3 commonly by welding. In lieu of a scored surface on backing plate 5, a self adhesive foam tape can be used to prevent slippage.

OPERATION OF THE ACCESSORY

When using the chain saw foot to mill rafter headcuts, begin by placing the material to be cut on a long rack side by side, with the crowns down and ends aligned. Snap a reference line for the headcut. Place the gas powered chainsaw guidebar 11 through clamp 3 and the aperature in baseplate 1 with the top edge of the chain bar facing away from the base of clamp 3 and adjusting bracket 4. Securely tighten set screws 6 and 7. Loosen wingnut 9 and pivot clamp 3 to the appropriate angle as defined by the pitch of the roof. Retighten wingnut 9 to lock the accessory at this angle. Start the motor and place the leading edge of baseplate 1 on the rack of lumber and push the unit forward until the outbound chain cuttersare just short of engaging the work. Thus positioned, open the throttle and push the unit across the pile following the snapline until all the boards have been milled.

Those skilled in the art of carpentry will realize that variations to the invention can be made without departing from the scope of this innvention.

I claim:

1. A foot for a chainsaw adapted to support the chainsaw for making headcuts in rafters, said chainsaw including a guidebar to support the circulation of a cutting chain in a direction away from the operator defining an upped cutting edge for the chainsaw and in a direction toward the operator defining a lower cutting edge for the chain saw, said support comprising:

a flat baseplate to rest upon the rafters during cutting, the baseplate having an aperture;

a hinge disposed on the baseplate and supporting a clamp for pivotal motion about an axis, said clamp having spaced arms to pass the chainsaw guidebar there between and through the aperture, a backing plate on one arm to support the guidebar and threaded screws on the other arm adapted to contact but not penetrate through the guidebar to clamp the guidebar against the backing plate and to the clamp, said guidebar when clamped adapted to pivot about said axis from a vertical position to approximately 75 degrees from the vertical;

an adjustment bracket upstanding from the baseplate proximate the aperture, said bracket including an arcuate slot having a radius centered at said axis;

a threaded stud secured to the backing plate and passing through the slot to receive a wingnut to secure the position of the stud, clamp and the angular position of guidebar relative to the baseplate, whereby the chainsaw is positioned to cut the rafters with the upper cutting edge with the weight of the chainsaw supported by the baseplate and while moving in a direction parallel to said axis.

2. The chainsaw foot of claim 1 further comprising an anti-skid pad attached to said backing plate.

* * * * *